(12) United States Patent
Wang et al.

(10) Patent No.: US 12,117,031 B2
(45) Date of Patent: Oct. 15, 2024

(54) SELF-LOCKING CONNECTION DEVICE AND ELECTRONIC APPARATUS WITH SELF-LOCKING CONNECTION DEVICE

(71) Applicant: GOERTEK INC., Shandong (CN)

(72) Inventors: Cheng Wang, Shandong (CN); Huifan Liu, Shandong (CN); Huigang Wang, Shandong (CN)

(73) Assignee: GOERTEK INC., Shandong (CN)

( * ) Notice: Subject to any disclaimer, the term of this patent is extended or adjusted under 35 U.S.C. 154(b) by 581 days.

(21) Appl. No.: 17/435,800

(22) PCT Filed: Sep. 29, 2019

(86) PCT No.: PCT/CN2019/109024
§ 371 (c)(1),
(2) Date: Sep. 2, 2021

(87) PCT Pub. No.: WO2020/248441
PCT Pub. Date: Dec. 17, 2020

(65) Prior Publication Data
US 2022/0049730 A1    Feb. 17, 2022

(30) Foreign Application Priority Data
Jun. 14, 2019 (CN) .......................... 201910515630.5

(51) Int. Cl.
*F16B 2/06* (2006.01)
(52) U.S. Cl.
CPC ..................... *F16B 2/06* (2013.01)
(58) Field of Classification Search
CPC ..... F16B 2/06; F16B 2/12; F16B 2/14; H02B 1/052; H02B 1/0523; H02B 1/0526;
(Continued)

(56) References Cited

U.S. PATENT DOCUMENTS 5,288,161 A    2/1994  Graves et al.
6,603,959 B1 *  8/2003  Peiker ................. B60R 11/0241
                                                      379/446
(Continued)

FOREIGN PATENT DOCUMENTS

CN    1692231    11/2005
CN    101223368    7/2008
(Continued)

OTHER PUBLICATIONS

International Search Report issued in PCT/CN2019/109024 dated Mar. 16, 2020.

*Primary Examiner* — Josh Skroupa
(74) *Attorney, Agent, or Firm* — HAUPTMAN HAM, LLP

(57) ABSTRACT

A self-locking connection device includes a housing, and a sliding block and a buckle, which are mounted in the housing. The sliding block slides back and forth along the housing and is locked in case that the sliding block is pushed to a front side, and is unlocked and reset in case that the sliding block is pushed to the front side again. An inclined wall for supporting the buckle is provided inside the housing, a height of the inclined wall gradually decreases from front to rear, the buckle is connected to the sliding block to move along the inclined wall with the sliding block, and the buckle is locked at a top end and protrudes out of the opening in case that the sliding block is locked at the front side.

16 Claims, 7 Drawing Sheets

(58) Field of Classification Search
CPC . H05K 5/0221; Y10T 403/59; Y10T 403/591; Y10T 403/598; Y10T 403/599; Y10T 403/60; Y10T 403/602; Y10T 403/604
USPC ..... 403/321, 322.1, 324, 325, 326, 327, 328
See application file for complete search history.

(56) References Cited

U.S. PATENT DOCUMENTS

| | | | |
|---|---|---|---|
| 6,775,561 B1 * | 8/2004 | Peiker | H04M 1/04 455/575.9 |
| 9,447,800 B2 * | 9/2016 | Xu | F16B 2/12 |
| 11,286,969 B2 * | 3/2022 | Wang | F16B 2/14 |
| 11,300,148 B2 * | 4/2022 | Brun | E05B 1/0038 |
| 11,382,226 B2 * | 7/2022 | Lin | H05K 5/0221 |
| 2009/0060646 A1 | 3/2009 | Wood | |
| 2010/0295426 A1 | 11/2010 | Zhu et al. | |

FOREIGN PATENT DOCUMENTS

| | | | | |
|---|---|---|---|---|
| CN | 202602726 | | 12/2012 | |
| CN | 103149981 | | 6/2013 | |
| CN | 203684815 | | 7/2014 | |
| CN | 105962602 | | 9/2016 | |
| CN | 107528160 | | 12/2017 | |
| CN | 208469737 | | 2/2019 | |
| CN | 109537246 | | 3/2019 | |
| CN | 110145527 | | 8/2019 | |
| DE | 29913281 U1 * | 10/1999 | ................ F16B 2/12 |
| EP | 2887471 A1 * | 6/2015 | ........... H02B 1/0523 |
| WO | WO2004015212 | | 2/2004 | |

\* cited by examiner

SELF-LOCKING CONNECTION DEVICE AND ELECTRONIC APPARATUS WITH SELF-LOCKING CONNECTION DEVICE

The present application is a 371 application of International Patent Application No. PCT/CN2019/109024, filed Sep. 29, 2019 which claims the priority to Chinese Patent Application No. 201910515630.5, titled "SELF-LOCKING CONNECTION DEVICE AND ELECTRONIC APPARATUS WITH SELF-LOCKING CONNECTION DEVICE", and filed with the China National Intellectual Property Administration filed on Jun. 14, 2019, which are incorporated herein by reference in their entirety.

FIELD

The preset application relates to the technical field of self-locking structures, and in particular to a self-locking connection device and an electronic apparatus with the self-locking connection device.

BACKGROUND

With the development of science and technology, people's requirements for the quality of life are getting higher and higher, and an electronic product has also developed from a single function to a diversified function. Taking a bracelet as an example, the function of the bracelet is no longer limited to health monitoring. In order to have multiple functions, the bracelet can be integrated with components such as an earphone. However, a bracelet main body and the earphone are mostly split and independent structures. A user needs to carry various components in case of using the bracelet, which is inconvenient, and components such as the earphone are easy to lose. Therefore, how to provide a reliable and convenient connection device to detachably mount the component such as the earphone on an electronic apparatus main body is a technical problem that needs to be solved by those skilled in the art.

SUMMARY

In view of this, a first object according to the present application is to provide a self-locking connection device, and a structural design of the self-locking connection device can effectively solve the problem that a moving part such as an earphone on an electronic apparatus is easy to lose and inconvenient to carry. A second object according to the present application is to provide an electronic apparatus including the above self-locking connection device.

In order to achieve the first object, the following technical solution is provided according to the present application:

A self-locking connection device, which includes a housing with an opening at a top end, a sliding block and a buckle mounted in the housing. The sliding block slides back and forth along the housing and is locked in case that the sliding block is pushed to a front side, and is unlocked and reset in case that the sliding block is pushed to the front side again through a self-locking structure. An inclined wall supported on a bottom surface of the buckle is provided inside the housing, a height of the inclined wall gradually decreases from front to rear, the buckle is connected to the sliding block to move back and forth along the inclined wall with the sliding block, and the buckle is locked at a top end and protrudes out of the opening in case that the sliding block is locked at the front side.

Preferably, in the above self-locking connection device, a mounting through hole is provided on the sliding block, the buckle is slidably mounted in the mounting through hole and moves back and forth with the sliding block under the pushing action of the mounting through hole.

Preferably, in the above self-locking connection device, the mounting through hole extends along the vertical direction, the buckle is in a vertical column shape, and the bottom surface has an inclined surface cooperating with the inclined wall.

Preferably, in the above self-locking connection device, the housing has a supporting sliding rail, a top surface of the supporting sliding rail is the inclined wall, a sliding groove cooperating with the supporting sliding rail is provided on the bottom surface of the buckle, a groove bottom of the sliding groove is the inclined surface, and two side walls of the sliding groove are located on two sides of the supporting sliding rail to limit a position of the supporting sliding rail.

Preferably, in the above self-locking connection device, a first elastic member is arranged between the buckle and the sliding block to deform in case that the buckle moves forward with the sliding block, and to generate a restoring force to push the buckle to reset after the sliding block is unlocked.

Preferably, in the above self-locking connection device, a protrusion protruding out of the opening is provided on the top end of the sliding block.

Preferably, in the above self-locking connection device, the housing includes a bracket and an upper cover, the opening is provided on the upper cover, a first groove and a second groove are provided in the bracket, the first groove and the second groove form a step surface, the sliding block is slidably mounted in the first groove and slides along the step surface, and the inclined wall is provide in the second groove.

Preferably, in the above self-locking connection device, the self-locking structure includes a limiting rod, a second elastic member and a self-locking sliding rail arranged on the sliding block, one end of the limiting rod is hinged to the bracket, the other end of the limiting rod has a hook, and the hook moves along the self-locking sliding rail, the self-locking sliding rail includes a locking rail, an unlocking rail and a self-locking engaging portion connected between the locking rail and the unlocking rail, the second elastic member is arranged between the sliding block and the housing, the second elastic member is deformed in case that the sliding block is pushed to the front side, and the hook slides along the locking rail to the self-locking engaging portion and self-locks under the action of the second elastic member, and the hook is unlocked along the unlocking rail and reset under the action of the second elastic member in case that the sliding block is pushed to the front side again.

The self-locking connection device provided according to the present application includes the housing, the sliding block and the buckle. The sliding block and the buckle are arranged inside the housing, an opening is provided at the top of the housing, so as to reserve space for the movement of the buckle and the external force to push the sliding block. The sliding block is slidably mounted in the housing along the front and rear direction, and is locked in case that the sliding block is pushed to the front side, and is unlocked and reset in case that the sliding block is pushed to the front side again through the self-locking structure. The inclined wall supported on the bottom surface of the buckle is provided inside the housing, the height of the inclined wall gradually decreases from front to rear. The buckle is connected to the sliding block, and the buckle is driven to move back and forth while the sliding block moves along the front and rear direction. Since the buckle cooperates with the inclined wall, the buckle generates displacement up and down while the buckle moves back and forth along the inclined wall, and the buckle is locked at the top end and protrudes out of the opening in case that the sliding block is locked at the front side.

In the self-locking connection device provided according to the present application, taking its application in an electronic apparatus to fix a moving part such as an earphone as an example. The housing is fixed on an apparatus main body of the electronic apparatus, in case that the moving part is fixed and mounted, the sliding block is pushed to move forward by the external force, the sliding block drives the buckle to move forward along the inclined wall at the same time, and since the height of the inclined wall gradually decreases from front to rear, the buckle gradually moves upward during the forward movement of the buckle. In case that the sliding block moves forward to a locking position and is locked by the self-locking structure, the top end of the buckle moves to the opening protruding out of the housing, and the buckle realizes self-locking synchronously due to the locking of the sliding block. Furthermore, the top end of the buckle can be inserted into the slot on the moving part such as the earphone, so as to limit the position of the moving part and realize its mounting and storage. In case that the moving part is needed, the sliding block is unlocked by the self-locking structure by just pushing the sliding block forward again, so that the sliding block and the buckle can be reset, and the top end of the buckle can be retracted to the slot of the moving part, and thus releasing the limiting effect on the moving part, and the moving part can be conveniently removed for use. The above description takes the self-locking connection device used for connecting electronic apparatus with earphones and other moving parts as an example. Of course, the self-locking connection device can also be used in other scenarios of connecting the connecting piece and the connected piece. In summary, the self-locking connection device provided according to the present application can reliably mount the connecting piece on the connected piece, and the mounting and removal of the connecting piece are realized by only pushing the sliding block, which has a simple and convenient operation and avoids the loss of the connecting piece.

In order to achieve the second object, an electronic apparatus is further provided according to the present application, which includes an apparatus main body and a moving part. A mounting groove for limiting a circumference of the moving part is provided on the apparatus main body, and the moving part is provided with a slot for inserting the buckle of the self-locking connection device to limit a direction in which the moving part is inserted into or pulled out of the mounting groove. Since the above self-locking connection device has the above technical effects, the electronic apparatus with the self-locking connection device should also have corresponding technical effects.

Preferably, in the above electronic apparatus, the electronic apparatus is a bracelet, the apparatus main body is a bracelet main body, and the moving part is an earphone.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

Figure 5:
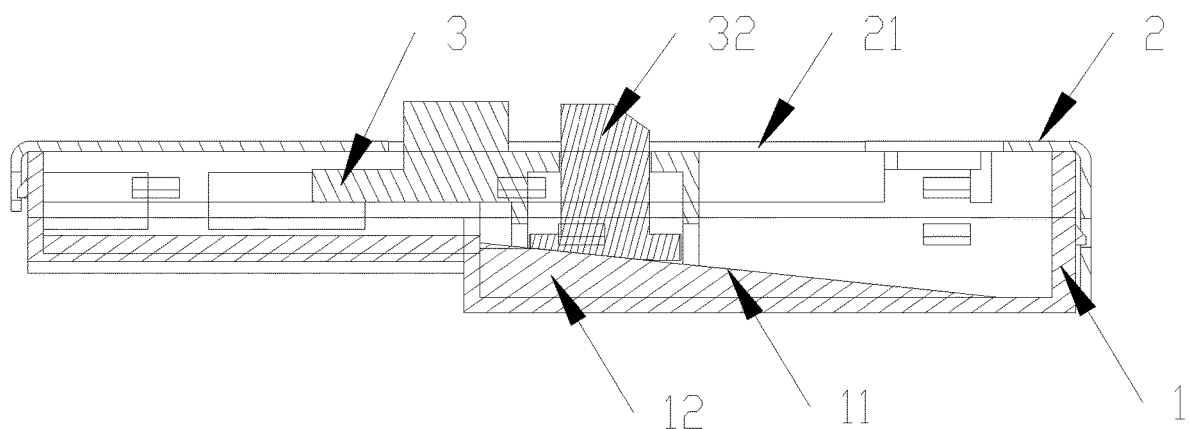
FIG. 5 is a schematic sectional view of the self-locking connection device in FIG. 1 in the self-locking state.

| Reference numerals in the drawings are as follows: | |
|---|---|
| 1 bracket, | 2 upper cover, |
| 3 sliding block, | 4 buckle, |
| 5 first elastic member, | 6 limiting rod, |
| 7 second elastic member, | 8 self-locking sliding rail, |
| 9 moving part, | 11 inclined wall, |
| 12 supporting sliding rail, | 13 first groove, |
| 14 second groove, | 15 step surface, |
| 21 opening, | 31 mounting through hole; |
| 32 protrusion, | 41 sliding groove; |
| 61 hook, | 81 locking rail, |
| 82 unlocking rail, | 83 self-locking engaging portion, |
| and a second spring in FIG. 5 is not shown. | |

DETAILED DESCRIPTION OF THE EMBODIMENTS

A self-locking connection device is provided according to the embodiments of the present application, which facilitates the mounting and removal of a moving part such as an earphone on an electronic apparatus.

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other obtained without creative efforts by those of the ordinary skill in the art shall fall within the protection scope of the present application.

Figure 1:
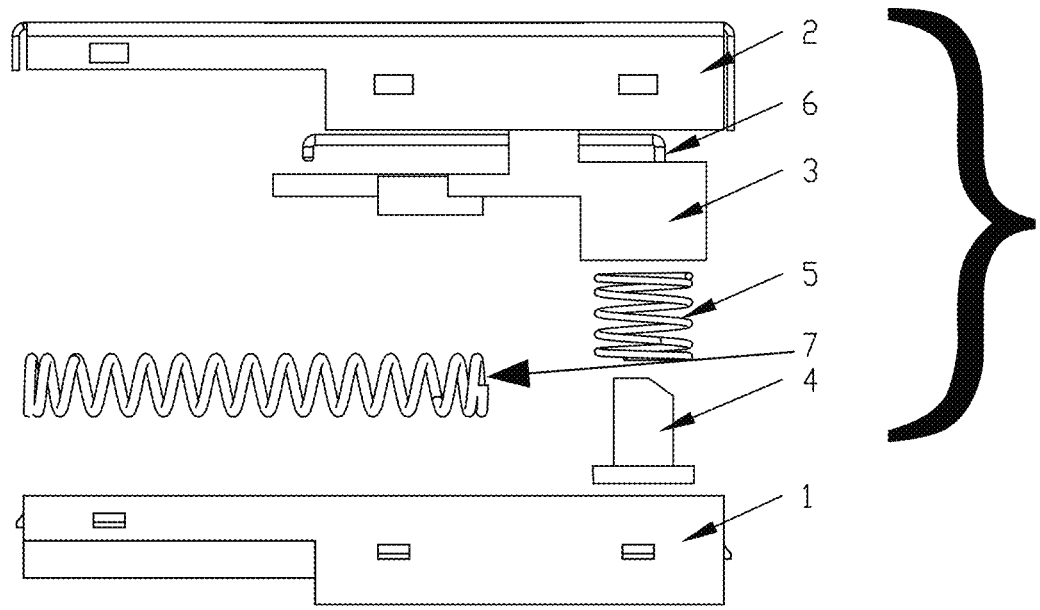
FIG. 1 is a schematic exploded view of a self-locking connection device according to a specific embodiment of the present application.
Figure 2:
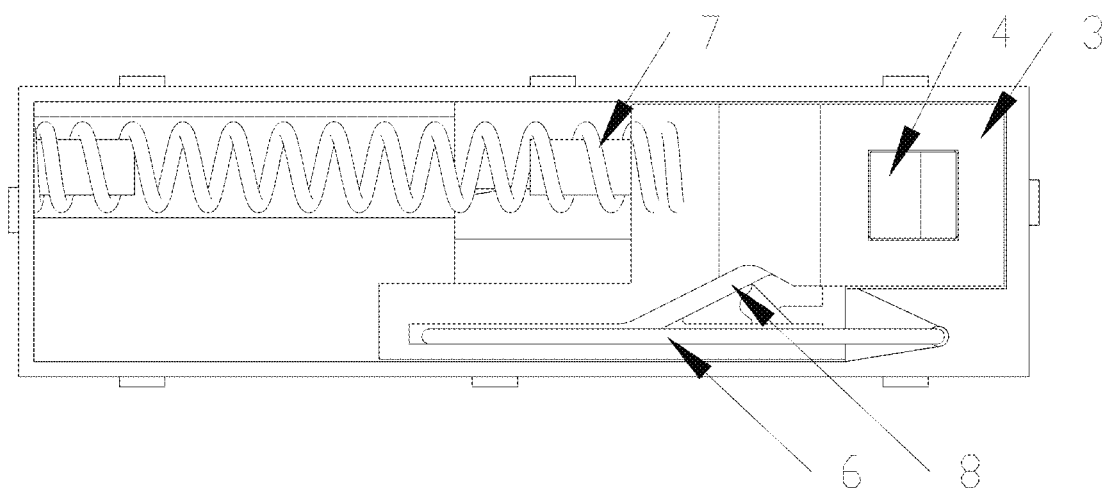
FIG. 2 is a schematic diagram showing an internal structure of the self-locking connection device in FIG. 1 in a non-self-locking state.
Figure 3:
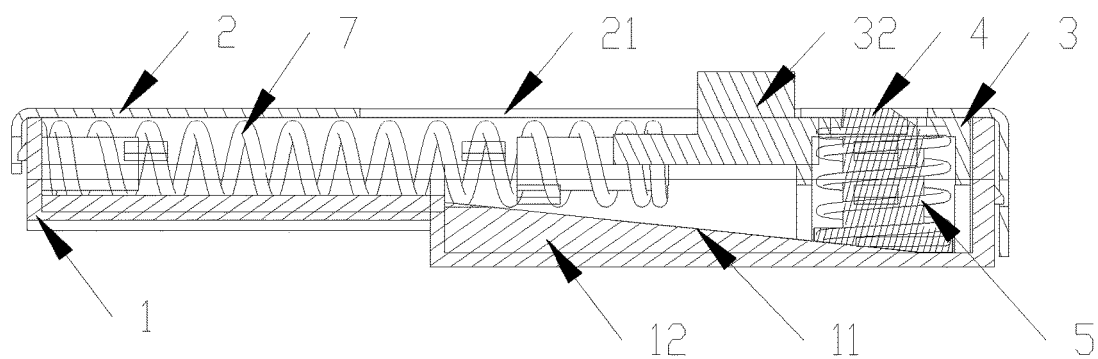
FIG. 3 is a schematic sectional view of the self-locking connection device in FIG. 1 in the non-self-locking state.
Figure 4:
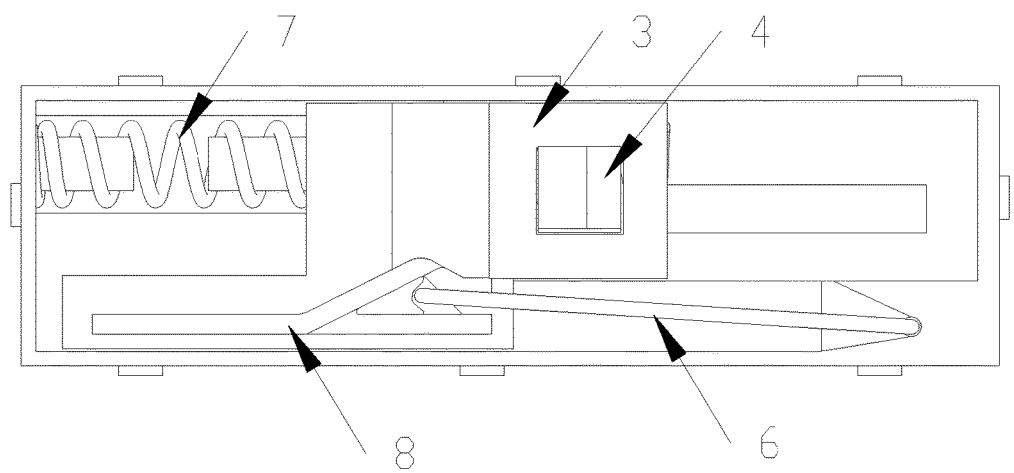
FIG. 4 is a schematic diagram showing an internal structure of the self-locking connection device in FIG. 1 in a self-locking state.

Referring to FIGS. 1 to 5, FIG. 1 is a schematic exploded view of a self-locking connection device according to a specific embodiment of the present application; FIG. 2 and FIG. 3 are respectively a schematic diagram showing an internal structure diagram and a schematic sectional view of the self-locking connection device in FIG. 1 in a non-self-locking state; and FIG. 4 and FIG. 5 are respectively a schematic diagram showing an internal structure and a schematic sectional view of the self-locking connection device in FIG. 1 in a self-locking state.

In a specific embodiment, the self-locking connection device provided according to the present application includes a housing, a sliding block 3 and a buckle 4.

The sliding block 3 and the buckle 4 are arranged inside the housing, an opening 21 is provided at a top of the housing, so as to reserve space for the movement of the buckle 4 and the external force to push the sliding block 3. That is, the housing has an inner chamber to accommodate the sliding block 3 and the buckle 4. Specifically, the housing may be a housing of a connected piece such as an apparatus main body of an electronic apparatus, that is, the housing of the connected piece is directly used, in which the sliding block 3 and the buckle 4 are arranged. Alternatively, a split or integrated housing may be arranged separately, and the housing may be fixed on the connected piece in case of operation. The specific shape of the housing may be arranged as required, which is not specified here.

The sliding block 3 slides back and forth along the housing and is locked in case that the sliding block 3 is pushed to a front side, and is unlocked and reset in case that the sliding block 3 is pushed to the front side again through a self-locking structure. That is, the sliding block 3 is slidably mounted in the housing along the front and rear direction. The slidably mounted here means that the sliding block 3 can move along the housing and is limited by the housing, but may not be removed from the housing. It should be noted that the front and rear direction herein refers to a relative direction, which is not limited to an absolute direction during the operation of the self-locking connection device. Through the arrangement of the self-locking structure, the sliding block 3 is locked in case that the sliding block 3 is pushed to the front side, and is unlocked and reset in case that the sliding block 3 is pushed to the front side again, that is, a push-push structure is utilized by the self-locking structure so as to lock and unlock the sliding block 3 by pressing. A conventional structure in the conventional technology may be specifically utilized by the push-push structure, which is not specifically limited here.

An inclined wall 11 for supporting a bottom surface of the buckle 4 is provided inside the housing, a height of the inclined wall 11 gradually decreases from front to rear. The buckle 4 is connected to the sliding block 3, and the buckle 4 is driven to move back and forth while the sliding block 3 moves back and forth. Since the buckle 4 cooperates with the inclined wall 11, the buckle 4 displaces up and down along the inclined wall 11 while the buckle 4 moves back and forth along the inclined wall 11, and the buckle 4 is locked at a top end and protrudes out of the opening 21 in case that the sliding block 3 is locked at the front side. That is, the buckle 4 is driven to slide along the inclined wall 11 to the front side while the sliding block 3 slides to the front side, and as the height of the inclined wall 11 gradually increases, the buckle 4 moves upward synchronously. In case that the sliding block 3 slides to a front end for self-locking, the buckle 4 synchronously realizes self-locking with the sliding block 3. Here, the top end of the buckle 4 protrudes out of the opening 21, that is, the buckle 4 is locked in a protruding state, so that it can be inserted into a slot on the connecting piece, so as to reliably limit the position of the connecting piece.

In case of unlocking, the sliding block 3 is pushed forward again, the sliding block 3 is unlocked by the self-locking structure, and the sliding block 3 moves backward, and the buckle 4 moves backward synchronously and displaces downward along the inclined wall 11, so that the top end of the buckle 4 retracts to exit the slot on the connecting piece, so as to unlock the connecting piece. The arrangement of the inclined wall 11 converts the back and forth movement of the sliding block 3 into the up and down movement of the buckle 4. It should be noted that the up and down here refers to a direction perpendicular to the front and rear, which does not limit the absolute direction in use.

A top end structure of the buckle 4 may be arranged in a column shape as required, and a slot is provided on the connecting piece, so that a circumference of the connecting piece is limited in case that the buckle 4 is inserted into the slot. Specifically, the self-locking connection device may be arranged on a side wall of a mounting groove for mounting the moving part on the connecting piece, and the mounting groove can limit the circumference of the connecting piece in case that the connecting piece is placed in the mounting groove. Furthermore, the buckle 4 is inserted into the slot of the connecting piece so as to limit a moving direction of the connecting piece along the mounting groove, so that the connecting piece cannot be detached form the mounting groove, and the connecting piece is reliably fixed in the mounting groove.

Alternatively, the top end of the buckle 4 may be provided with a buckle head capable of engaging with a buckle slot on the connecting piece, or the buckle slot engaging with the buckle head on the connecting piece, that is, the buckle 4 can directly engage with the connecting piece to realize reliable connection between the connecting piece and the connected piece. With this arrangement, in case of unlocking, an engaging force between the buckle head and the buckle slot while the sliding block 3 is pushed forward again must be overcome.

In the self-locking connection device provided according to the present application, taking its application in an electronic apparatus to fix a moving part such as an earphone as an example. The housing is fixed on the apparatus main body of the electronic apparatus, in case of fixing and mounting the moving part, the sliding block 3 is pushed to move forward by the external force, the sliding block 3 drives the buckle 4 to move forward along the inclined wall 11 and gradually move upward synchronously. In case that the sliding block 3 moves forward to a locking position and is locked by the self-locking structure, the top end of the buckle 4 moves to the opening 21 protruding out of the housing, and the buckle 4 realizes self-locking synchronously due to the locking of the sliding block 3. Furthermore, the top end of the buckle 4 can be inserted into the slot on the moving part such as the earphone so as to limit the position of the moving part and realize its mounting and storage.

In case that the moving part is needed, the sliding block is unlocked by the self-locking structure by just pushing the sliding block 3 forward again, so that the sliding block 3 and the buckle 4 can be reset, and the top end of the buckle 4 can be retracted to the slot of the moving part, and thus releasing the limiting effect on the moving part, and the moving part can be conveniently removed for use. The above description has been given by taking the self-locking connection device used for the electronic apparatus such as the earphone as an example, which can also be used in a scenario of other connecting piece and connected piece. In summary, the self-locking connection device provided according to the present application can reliably fix and mount the moving part, and the mounting and removal of the moving part are realized by only pushing the sliding block 3, which has a simple and convenient operation.

Further, a mounting through hole 31 is provided on the sliding block 3, the buckle 4 is slidably mounted in the mounting through hole 31 and moves back and forth with the sliding block 3 under the push of the mounting through hole 31. The slidably mounting here refers to the buckle 4 can move along the mounting through hole 31 and cannot be detached from the mounting through hole 31. A length of the buckle 4 may be arranged as required, so that a top end of the buckle 4 is still in the mounting through hole 31 in case that the buckle 4 moves with the sliding block 3 to a bottom end of the inclined wall 11, which can effectively limit the position of the buckle 4. Specifically, the bottom end of the buckle 4 may be provided with a flange, and a size of the opening 21 at the top end of the mounting through hole 31 is not smaller than a size of the top end of the buckle 4, and is smaller than a size of the flange, so that the flange can limit the buckle 4 in the mounting through hole 31. The arrangement of the mounting through hole 31 facilitates the guiding of up and down movement of the buckle 4, so that the movement is more smoothly, and the buckle 4 can be pushed to move back and forth while the sliding block 3 moves back and forth, and the overall structure is reliable and compact.

The sliding block 3 may be connected to the buckle 4 through a connecting rod as required. Two ends of the connecting rod are respectively hinged to the sliding block 3 and the buckle 4, so that the buckle 4 is driven to move back and forth along the inclined wall 11 while the sliding block 3 moves back and forth along the housing, and is displaced up and down due to the inclined wall 11. In order to ensure the stable movement of the buckle 4 with the sliding block 3, a limiting groove cooperating with the buckle 4 may be further provided in the housing, so as to guide and limit the buckle 4.

Specifically, the mounting through hole 31 extends vertically up and down, the buckle 4 is in a vertical column shape, and the bottom surface has an inclined surface cooperating with the inclined wall 11. That is, the buckle 4 is mounted in the up and down direction as a whole, so as to move along the mounting through hole 31 up and down. Since the buckle 4 is mounted up and down, the bottom surface of the buckle 4 is arranged as an inclined surface with the same angle as the inclined wall 11 for cooperating with the inclined wall 11. This arrangement facilitates the cooperation between the buckle 4 and the connecting piece and the arrangement of the slot on the connecting piece. The buckle 4 may be mounted obliquely along the inclined wall 11 as required, and the mounting through hole 31 is provided obliquely accordingly. In order to facilitate the cooperation with the slot, the buckle 4 may be in a fold line shape, one section of the fold line is inclined to cooperate with the mounting through hole 31, and the other section may be vertical to move up and down.

Figure 6:
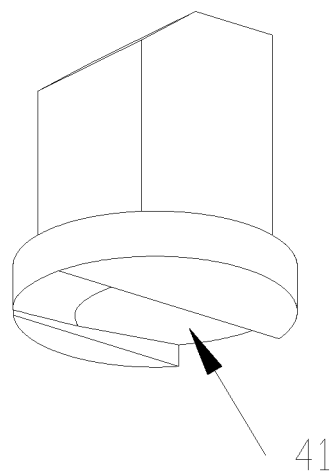
FIG. 6 is a schematic structural diagram of a buckle in FIG. 1.
Figure 7:
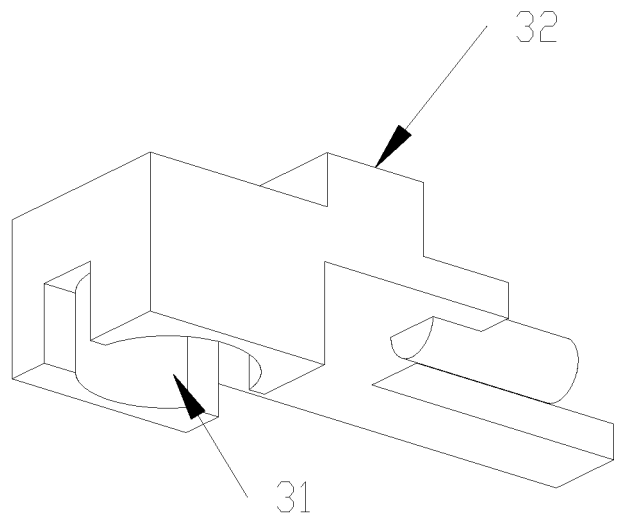
FIG. 7 is a schematic diagram showing a three-dimensional structure of a sliding block in FIG. 1.
Figure 8:
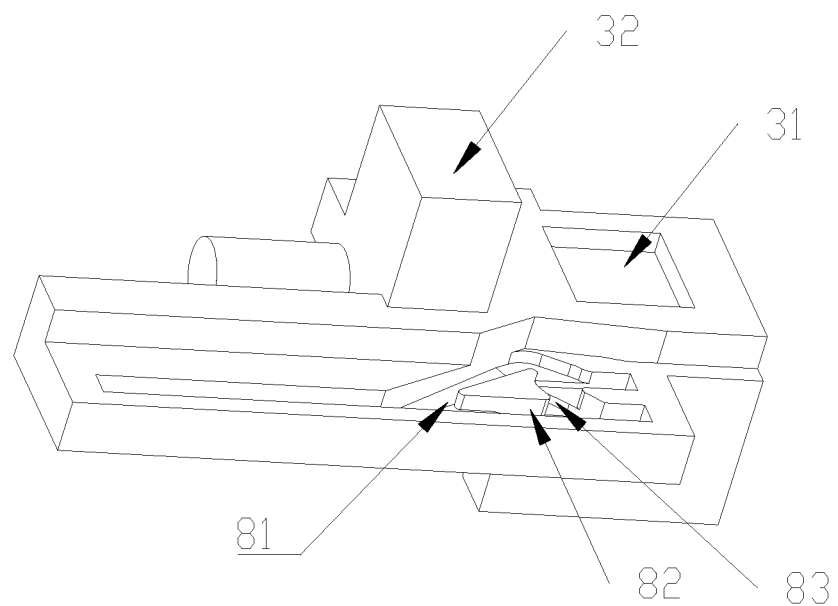
FIG. 8 is a schematic diagram showing a three-dimensional structure of the sliding block viewed from another perspective.
Figure 9:
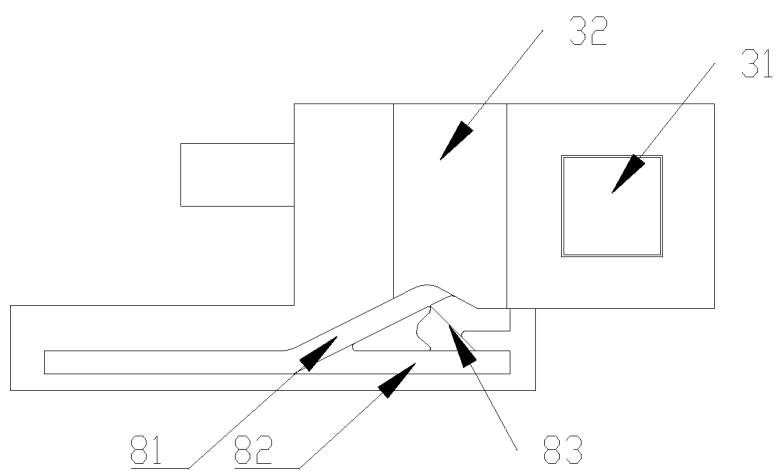
FIG. 9 is a schematic top view of the sliding block.
Figure 10:
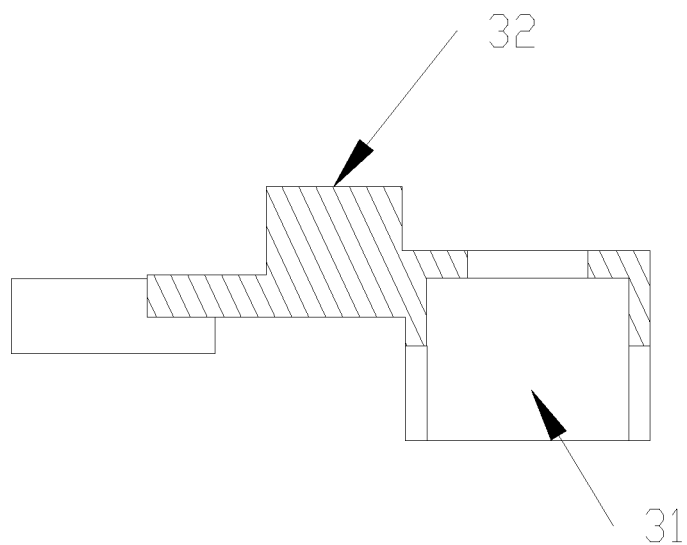
FIG. 10 is a schematic sectional view of the sliding block.

Further, the housing has a supporting sliding rail 12, a top surface of the supporting sliding rail 12 is the inclined wall 11, a sliding groove 41 cooperating with the supporting sliding rail 12 is provided on the bottom surface of the buckle 4, a groove bottom of the sliding groove 41 is the inclined surface, and two side walls of the sliding groove 41 are located on two sides of the supporting sliding rail 12 to limit its position. Referring to FIG. 6, FIG. 6 is a schematic structural diagram of the buckle 4 in FIG. 1. Through the arrangement of the sliding groove 41 of the buckle 4 and the supporting sliding rail 12, the two side walls of the sliding groove 41 are located on the two sides of the supporting sliding rail 12, so that the supporting sliding rail 12 not only guides back and forth movement and up and down movement of the buckle 4, but also limits left and right movement of the buckle 4, thus making the buckle moves more smoothly. A width of the supporting sliding rail 12 may be arranged as required as long as it can support the buckle 4 stably.

In the above embodiments, a first elastic member 5 is arranged between the buckle 4 and the sliding block 3, so as to deform in case that the buckle 4 moves forward with the sliding block 3, and to generate a restoring force to push to the buckle 4 to reset after the sliding block 3 is unlocked. Through the arrangement of the first elastic member 5, the first elastic member 5 is deformed in case that the buckle 4 moves forward and generates the restoring force, and after the sliding block 3 is unlocked, the restoring force of the first elastic member 5 can be used as a force to push the buckle 4 to reset. Specifically, the first elastic member 5 may be a compressed elastic member for pushing the buckle 4 in a retracting direction, so that in case that the sliding block 3 is in a non-self-locking state without external force, the compression elastic member pushes the buckle 4 to an original retracted state. The first elastic member 5 may specifically be a spring, or other material member or structural member with elastic deformation and recovery capability as required. In a case that the first elastic member 5 is a spring, the bottom end of the buckle 4 is preferably provided with a flange, the mounting hole is a step hole, the spring is a compression spring and two ends of the spring respectively abut against the flange and a step surface of the step hole. Preferably, the compression spring is sheathed outside the top end of the buckle 4.

On the basis of the above embodiments, as a preferred embodiment, the self-locking structure includes a reset elastic member arranged between the sliding block 3 and the housing, so that the elastic member is deformed in case that the sliding block 3 moves forward, and generates the restoring force to push the sliding block 3 to reset after the sliding block 3 is unlocked. Through the arrangement of the reset elastic member, the reset elastic member is deformed in case that the sliding block 3 moves forward and generates the restoring force, and after the sliding block 3 is unlocked, the restoring force of the reset elastic member pushes the sliding block 3 to move backward to reset. Specifically, the reset elastic member may be a compression elastic member at a front end of the sliding block 3 for pushing the sliding block 3 backward or a tensile elastic member at a rear end of the sliding block 3, so that in case that the sliding block 3 is in a non-self-locking state without external force, the compression elastic member or the tensile elastic member pushes the sliding block 3 to an original state at the rear side. The reset elastic member may specifically be a spring, or other material member or structural member with elastic deformation and recovery capability as required. In a case that the reset elastic member is a spring, it may specifically be a compression spring and two ends of the spring respectively abut against a front end surface of the sliding block 3 and the housing. Preferably, a guide column is respectively provide on the front end of the sliding block 3 and the housing, and the two ends of the compression spring are sheathed outside the guide columns, so that on one hand the guide column can support and guide the compression spring, which makes its deformation more stable, and on the other hand, the guide column can limit a maximum compression amount and protect the compression spring.

In order to facilitate the external force to push the sliding block 3, a protrusion 32 protruding out of the opening 21 is provided on the top end of the sliding block 3. Furthermore, the external force directly acts on the protrusion 32 to self-lock or lock the sliding block 3. In case of storing the connecting piece, the protrusion 32 can be acted on by the connecting piece to push the sliding block 3 to move forward. If necessary, the protrusion 32 may not be provided. In order to facilitate a user to push, structure such as a groove which is convenient for the user to push may be provided at the top end of the sliding block 3.

Further, the protrusion 32 is located at the front end of the buckle 4, and a distance between the protrusion 32 and the buckle 4 is adapted to a distance between the slot on the connecting piece and the front end surface. In case of storing the connecting piece, the user can hold the connecting piece against the protrusion 32 and push the sliding block 3 forward, the buckle 4 moves upward synchronously and is directly inserted into the slot on the connecting piece. Further, the user only needs to hold the connecting piece with one hand, and does not need to hold the connecting piece with one hand and push the sliding block 3 with the other hand, which makes the operation easier and faster. The connecting piece is removed by just pushing the connecting piece forward.

Figure 11:
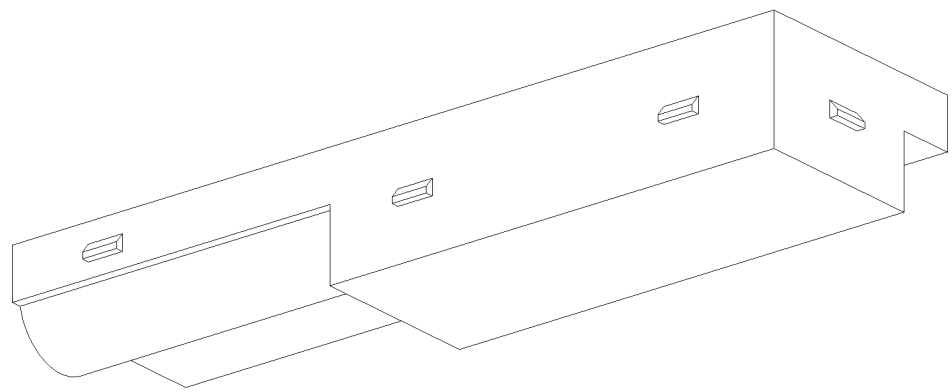
FIG. 11 is a schematic diagram showing a three-dimensional structure of a bracket in FIG. 1.
Figure 12:
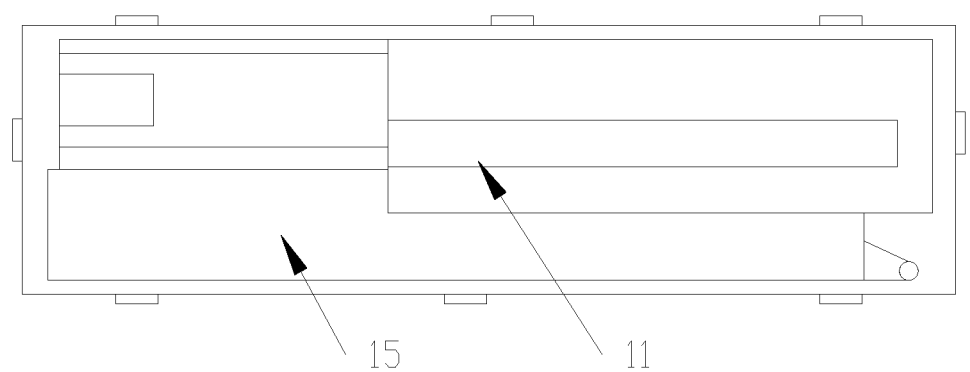
FIG. 12 is a schematic top view of the bracket.
Figure 13:
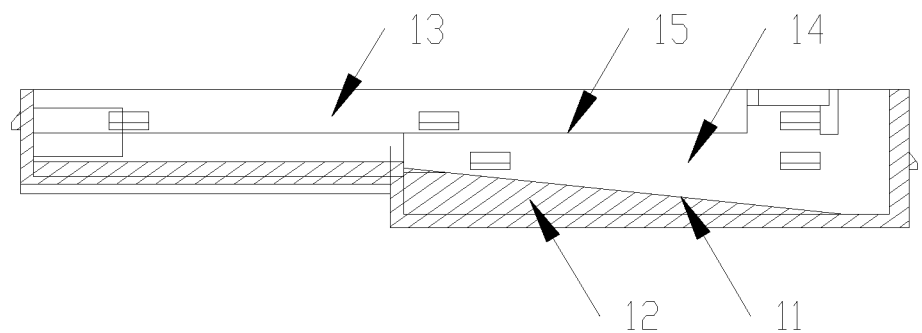
FIG. 13 is a schematic sectional view of the bracket.
Figure 14:
FIG. 14 is a schematic structural diagram of a limiting rod in FIG. 1.

In the above embodiments, the housing includes a bracket 1 and an upper cover 2 which are fixedly connected, the opening 21 is provided on the upper cover 2, a first groove 13 and a second groove 14 are provided in the bracket 1, the first groove 13 and the second groove 14 form a step surface 15, the sliding block 3 is slidably mounted in the first groove 13 and slides along the step surface 15, and the inclined wall 11 is provide in the second groove 14. That is, the housing has a split structure, which facilitates the assembly of the sliding block 3 and the buckle 4. Referring to FIGS. 11 to 13, FIG. 11 is a schematic diagram showing a three-dimensional structure of the bracket 1 in FIG. 1; FIG. 12 is a schematic top view of the bracket 1; and FIG. 13 is a schematic sectional view of the bracket 1. The first groove 13 and the second groove 14 are arranged in the bracket 1, and the first groove 13 and the second groove 14 form the step surface 15, the first groove 13 is located above, and the second groove 14 is located below, the sliding block 3 is slidably mounted in the first groove 13 and slides along the step surface 15, the step surface 15 provides a reliable support for the sliding block 3, and the inclined wall 11 is arranged in the second groove 14 to cooperate with the buckle 4. The top surface of the sliding block 3 is limited by the upper cover 2, a position, shape, and size of the opening 21 are arranged according to the moving path of the sliding block 3 and the buckle 4.

On the basis of the above embodiments, the self-locking structure includes a limiting rod 6, a second elastic member 7 and a self-locking sliding rail 8 arranged on the sliding block 3, one end of the limiting rod 6 is hinged to the bracket 1, another end of the limiting rod 6 has a hook 61, and the hook 61 moves along the self-locking sliding rail 8, the self-locking sliding rail 8 includes a locking rail 81, an unlocking rail 82 and a self-locking engaging portion 83 connected between the locking rail 81 and the unlocking rail 82, the second elastic member 7 is arranged between the sliding block 3 and the housing, the second elastic member 7 is deformed in case that the sliding block 3 is pushed to the front side, and the hook 61 slides along the locking rail 81 to the self-locking engaging portion 83 and self-locks under the action of the second elastic member 7, and the hook 61 is unlocked along the unlocking rail 82 and reset under the action of the second elastic member 7 in case that the sliding block 3 is pushed to the front side again. Specifically, the limiting rod 6 may be in a U-shape, and one vertical side of the U-shape is the hook 61. In case that the above structure is adopted by the self-locking structure, the second elastic member 7 is the above reset elastic member. Referring to FIG. 2 and FIG. 4, FIG. 2 is a schematic diagram showing an internal structure of the self-locking connection device in FIG. 1 in the non-self-locking state; and FIG. 4 is a schematic diagram showing an internal structure of the self-locking connection device in FIG. 1 in the self-locking state. The locking rail 81 and the unlocking rail 82 of the self-locking sliding rail 8 are in a Y-shape, an internal connecting portion of the Y-shaped opening 21 is the self-locking engaging portion 83. In case that the sliding block 3 is pushed forward, the hook 61 of the limiting rod 6 gradually moves backward along the locking rail 81 from a foremost end of the locking rail 81 to a rearmost end of the locking rail 81, and after the sliding block 3 is released, the sliding block 3 is driven by the hook 61 to move backward under the action of a restoring force of the second elastic member 7, the hook 61 moves forward and enters the self-locking engaging portion 83 to engage with the sliding block 3, so as to self-lock the sliding block 3. In case that the sliding block 3 is pushed forward by the external force again, the hook 61 moves backward along the unlocking rail to unlock, and the sliding block 3 is pushed to move backward under the action of the restoring force of the second elastic member 7, and the hook 61 moves forward along the unlocking rail to an original state. The locking rail 81 and the unlocking rail 82 realize the guiding of the hook 61 through the step surface. The specific structure arrangement can refer to the conventional push-push structure with a Y-shaped rail in the conventional technology, such as a mounting structure of a SIM card. A ratchet self-locking structure similar to pressing a ballpoint pen may be used by the self-locking structure here as required.

Based on the self-locking structure provided according to the above embodiments, an electronic apparatus is further provided according to the present application. The electronic apparatus includes an apparatus main body and a moving part 9. A mounting groove for limiting a circumference of the moving part 9 is provided on the apparatus main body, the mounting groove has the self-locking connection device according to any one of the above embodiments, and a slot for inserting the buckle 4 of the self-locking connection device to limit a direction in which the moving part 9 is inserted into the mounting groove is provided on the moving part 9.

Figure 15:
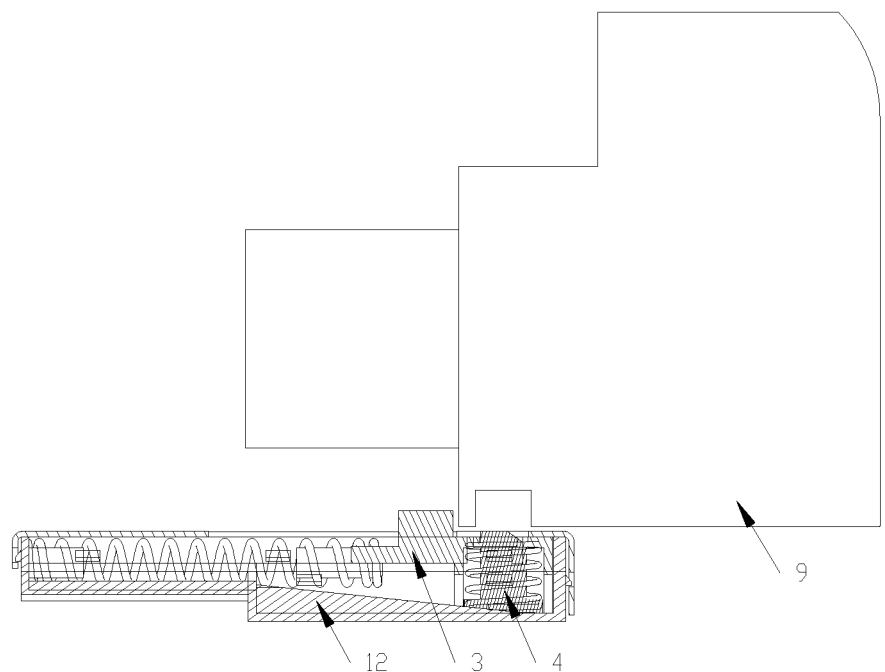
FIG. 15 is a schematic diagram of a moving part not realizing self-locking through the self-locking connection device.
Figure 16:
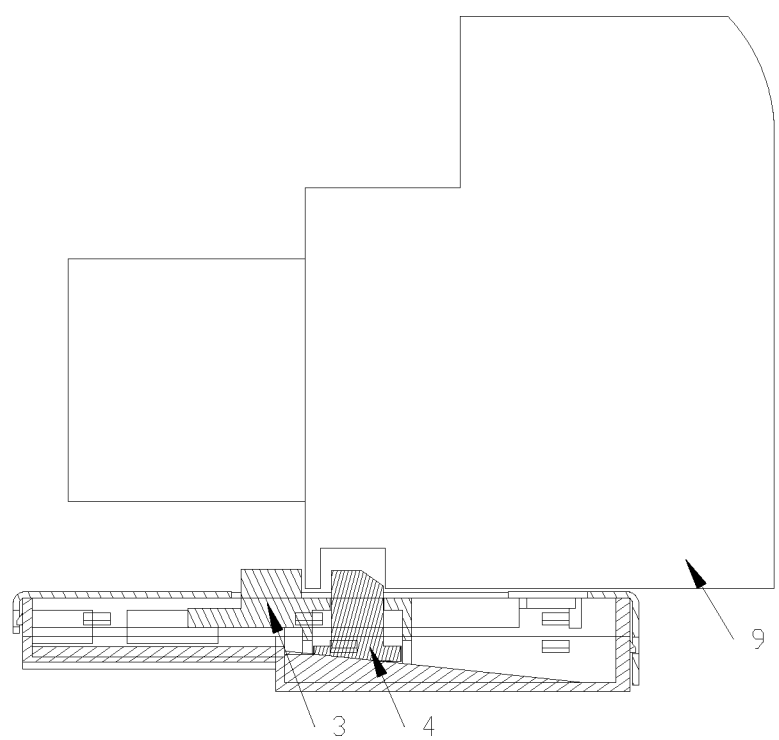
FIG. 16 is a schematic diagram of the moving part realizing self-locking through the self-locking connection device.

In case that the moving part 9 is inserted into the mounting groove, the mounting groove can limit the circumference of the moving part 9. In combination with the limiting effect of the buckle 4 of the self-locking connection device and the slot on the moving part 9, the insertion or extraction displacement of the moving part 9 along the mounting groove is also limited, so that the moving part 9 is reliably fixed in the mounting groove. Referring to FIG. 15 and FIG. 16, FIG. 15 is a schematic diagram of the moving part 9 not realizing self-locking through the self-locking connection device; and FIG. 16 is a schematic diagram of the moving part 9 realizing self-locking through the self-locking connection device. With this arrangement, in case of storing or using the moving part 9, the moving part 9 is self-locked or unlocked by just pushing the moving part 9 and pressing the sliding block 3 to move forward, which is convenient to use, time-saving and labor-saving, and can realize one-hand operation. Specifically, the self-locking connection device may be fixed on a side wall of the mounting groove, and up and down movement of the buckle 4 is a movement perpendicular to the side wall, that is, an up and down movement direction of the buckle 4 is perpendicular to the side wall to mount the self-locking connection device. Therefore, the cooperation of the buckle 4 and the slot is more reliable, and is not easy to be detached due to accidental contact by an external force.

Specifically, the electronic apparatus is a bracelet, the apparatus main body is a bracelet main body, and the moving part 9 is an earphone. The bracelet may be configured with one or two earphones, in a case that two earphones are provided, the two earphones are mounted on a bracelet main body through the self-locking connection device in the above embodiments. The electronic apparatus may also be a wearable device such as a watch and a head display, a mobile terminal such as a mobile phone and a tablet, or other device having a moving part 9 detachably mounted with the main body such as a tracker as required.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A self-locking connection device, comprising:
    a housing with an opening at a top; and
    a sliding block and a buckle which are mounted in the housing,
    wherein
    the sliding block slides back and forth along the housing and is locked in case that the sliding block is pushed to a front side, and is unlocked and reset in case that the sliding block is pushed to the front side again through a self-locking structure,
    an inclined wall for supporting a bottom surface of the buckle is provided inside the housing,
    a height of the inclined wall gradually decreases from front to rear, the buckle is connected to the sliding block to move back and forth along the inclined wall with the sliding block, and
    the buckle is locked at a top end and protrudes out of the opening in case that the sliding block is locked at the front side.

2. The self-locking connection device according to claim 1, wherein:
    a mounting through hole is provided on the sliding block, and
    the buckle is slidably mounted in the mounting through hole and moves back and forth with the sliding block under the push of the mounting through hole.

3. The self-locking connection device according to claim 2, wherein:
    the self-locking structure comprises:
        a limiting rod;
        a second elastic member; and
        a self-locking sliding rail arranged on the sliding block, one end of the limiting rod is hinged to the bracket, the other end of the limiting rod has a hook, and the hook moves along the self-locking sliding rail,
    the self-locking sliding rail comprises:
        a locking rail;
        an unlocking rail; and
        a self-locking engaging portion connected between the locking rail and the unlocking rail, the second elastic member is arranged between the sliding block and the housing,
    the second elastic member is deformed in case that the sliding block is pushed to the front side,
    the hook slides along the locking rail to the self-locking engaging portion and self-locks under the action of the second elastic member, and
    the hook is unlocked along the unlocking rail and reset under the action of the second elastic member in case that the sliding block is pushed to the front side again.

4. The self-locking connection device according to claim 2, wherein:
    the mounting through hole extends along a vertical direction,
    the buckle is in a vertical column shape, and
    the bottom surface of the buckle has an inclined surface cooperating with the inclined wall.

5. The self-locking connection device according to claim 4, wherein:
    the self-locking structure comprises:
        a limiting rod;
        a second elastic member; and
        a self-locking sliding rail arranged on the sliding block, one end of the limiting rod is hinged to the bracket, the other end of the limiting rod has a hook,
    the hook moves along the self-locking sliding rail,
    the self-locking sliding rail comprises:
        a locking rail;
        an unlocking rail; and
        a self-locking engaging portion connected between the locking rail and the unlocking rail, the second elastic member is arranged between the sliding block and the housing, the second elastic member is deformed in case that the sliding block is pushed to the front side,
    the hook slides along the locking rail to the self-locking engaging portion and self-locks under the action of the second elastic member, and
    the hook is unlocked along the unlocking rail and reset under the action of the second elastic member in case that the sliding block is pushed to the front side again.

6. The self-locking connection device according to claim 4, wherein:
    the housing has a supporting sliding rail,
    a top surface of the supporting sliding rail is the inclined wall,
    a sliding groove cooperating with the supporting sliding rail is provided on the bottom surface of the buckle,
    a groove bottom of the sliding groove is the inclined surface, and
    two side walls of the sliding groove are located on two sides of the supporting sliding rail to limit a position of the supporting sliding rail.

7. The self-locking connection device according to claim 6, wherein:
the self-locking structure comprises:
a limiting rod;
a second elastic member; and
a self-locking sliding rail arranged on the sliding block, one end of the limiting rod is hinged to the bracket, the other end of the limiting rod has a hook,
the hook moves along the self-locking sliding rail,
the self-locking sliding rail comprises:
a locking rail;
an unlocking rail; and
a self-locking engaging portion connected between the locking rail and the unlocking rail, the second elastic member is arranged between the sliding block and the housing, the second elastic member is deformed in case that the sliding block is pushed to the front side,
the hook slides along the locking rail to the self-locking engaging portion and self-locks under the action of the second elastic member, and
the hook is unlocked along the unlocking rail and reset under the action of the second elastic member in case that the sliding block is pushed to the front side again.

8. The self-locking connection device according to claim 1, wherein:
a first elastic member is arranged between the buckle and the sliding block to deform in case that the buckle moves forward with the sliding block, and to generate a restoring force to push the buckle to reset after the sliding block is unlocked.

9. The self-locking connection device according to claim 8, wherein:
the self-locking structure comprises:
a limiting rod;
a second elastic member; and
a self-locking sliding rail arranged on the sliding block, one end of the limiting rod is hinged to the bracket, the other end of the limiting rod has a hook,
the hook moves along the self-locking sliding rail,
the self-locking sliding rail comprises:
a locking rail;
an unlocking rail; and
a self-locking engaging portion connected between the locking rail and the unlocking rail, the second elastic member is arranged between the sliding block and the housing, the second elastic member is deformed in case that the sliding block is pushed to the front side,
the hook slides along the locking rail to the self-locking engaging portion and self-locks under the action of the second elastic member, and
the hook is unlocked along the unlocking rail and reset under the action of the second elastic member in case that the sliding block is pushed to the front side again.

10. The self-locking connection device according to claim 1, wherein a protrusion protruding out of the opening is provided on the top end of the sliding block.

11. The self-locking connection device according to claim 10, wherein:
the self-locking structure comprises:
a limiting rod;
a second elastic member; and
a self-locking sliding rail arranged on the sliding block, one end of the limiting rod is hinged to the bracket, the other end of the limiting rod has a hook,
the hook moves along the self-locking sliding rail,
the self-locking sliding rail comprises:
a locking rail;
an unlocking rail; and
a self-locking engaging portion connected between the locking rail and the unlocking rail, the second elastic member is arranged between the sliding block and the housing, the second elastic member is deformed in case that the sliding block is pushed to the front side,
the hook slides along the locking rail to the self-locking engaging portion and self-locks under the action of the second elastic member, and
the hook is unlocked along the unlocking rail and reset under the action of the second elastic member in case that the sliding block is pushed to the front side again.

12. The self-locking connection device according to claim 1, wherein:
the housing comprises a bracket and an upper cover,
the opening is provided on the upper cover,
a first groove and a second groove are provided in the bracket,
the first groove and the second groove form a step surface,
the sliding block is slidably mounted in the first groove and slides along the step surface, and
the inclined wall is provided in the second groove.

13. The self-locking connection device according to claim 12, wherein:
the self-locking structure comprises:
a limiting rod;
a second elastic member; and
a self-locking sliding rail arranged on the sliding block, one end of the limiting rod is hinged to the bracket, the other end of the limiting rod has a hook, and the hook moves along the self-locking sliding rail,
the self-locking sliding rail comprises a locking rail, an unlocking rail and a self-locking engaging portion connected between the locking rail and the unlocking rail, the second elastic member is arranged between the sliding block and the housing, the second elastic member is deformed in case that the sliding block is pushed to the front side,
the hook slides along the locking rail to the self-locking engaging portion and self-locks under the action of the second elastic member, and
the hook is unlocked along the unlocking rail and reset under the action of the second elastic member in case that the sliding block is pushed to the front side again.

14. The self-locking connection device according to claim 1, wherein:
the self-locking structure comprises:
a limiting rod;
a second elastic member; and
a self-locking sliding rail arranged on the sliding block,
one end of the limiting rod is hinged to the bracket,
the other end of the limiting rod has a hook,
the hook moves along the self-locking sliding rail,
the self-locking sliding rail comprises:
a locking rail;
an unlocking rail; and
a self-locking engaging portion connected between the locking rail and the unlocking rail,
the second elastic member is arranged between the sliding block and the housing, the second elastic member is deformed in case that the sliding block is pushed to the front side, the hook slides along the locking rail to the self-locking engaging portion and self-locks under the action of the second elastic member, and the hook is unlocked along the unlocking rail and reset under the action of the second elastic member in case that the sliding block is pushed to the front side again.

15. An electronic apparatus, comprising:

an apparatus main body; and a moving part, wherein a mounting groove for limiting a circumference of the moving part is provided on the apparatus main body, the mounting groove has the self-locking connection device according to claim 1, and the moving part is provided with a slot for inserting the buckle of the self-locking connection device to limit a direction in which the moving part is inserted into or pulled out of the mounting groove.

16. The electronic apparatus according to claim 15, wherein:

the electronic apparatus is a bracelet, the apparatus main body is a bracelet main body, and the moving part is an earphone.

\* \* \* \* \*